United States Patent [19]

Raynolds

[11] 4,147,851

[45] Apr. 3, 1979

[54] FLUORINE-CONTAINING OIL- AND WATER-REPELLANT COPOLYMERS

[75] Inventor: Stuart Raynolds, Wilmington, Del.

[73] Assignee: E. I. Du Pont De Nemours and Company, Wilmington, Del.

[21] Appl. No.: 915,152

[22] Filed: Jun. 13, 1978

[51] Int. Cl.$^2$ ............................................. C08F 220/24
[52] U.S. Cl. ..................................... 526/245; 428/394; 526/246
[58] Field of Search ................. 526/245, 246, 307, 311

[56] References Cited

U.S. PATENT DOCUMENTS

| | | | |
|---|---|---|---|
| 3,248,352 | 4/1966 | Marascia et al. | 526/311 |
| 3,282,905 | 11/1966 | Fasick et al. | 526/245 |
| 3,378,609 | 4/1968 | Fasick et al. | 260/890 |
| 3,838,104 | 9/1974 | Hayashi et al. | 526/245 |
| 3,972,998 | 8/1976 | Keiner | 424/70 |
| 4,013,627 | 3/1977 | Temple | 526/245 |
| 4,075,183 | 2/1978 | Kawakami et al. | 526/307 |

*Primary Examiner*—Harry Wong, Jr.

[57] ABSTRACT

Copolymers comprising (i) from 50 to 85 percent by weight of units derived from a perfluoroaliphatic acrylate or methacrylate monomer and (ii) from 50 to 15 percent by weight of units derived from a dialkylaminoalkyl acrylate or methacrylate or the corresponding acrylamide or methacrylamide monomer in its amine salt, quaternary ammonium or amine oxide form. The copolymers are useful in oil and water repellency applications.

17 Claims, No Drawings

FLUORINE-CONTAINING OIL- AND WATER-REPELLANT COPOLYMERS

BACKGROUND OF THE INVENTION

This invention relates to fluorine-containing oil- and water-repellent copolymers.

Fluorine-containing polymers are known which impart oil and water repellency to substrates such as fabric and paper. There is nothing in the art, however, that teaches the copolymers of this invention. The instant copolymers have oil and water repellency properties as well as unique aqueous and organic solubility properties. The copolymers are useful for treating substrates where mild drying conditions are desirable, such as woolen apparel, upholstery fabrics and leather. The copolymers are also useful for treating textiles and particularly paper in applications where oil, water or organic solvent repellency is desired.

SUMMARY OF THE INVENTION

This invention concerns copolymers comprising (i) from 50 to 85 percent by weight of units derived from a monomer of the formula $$R_fQO_2CC(R)=CH_2$$

wherein $R_f$ is a straight- or branched-chain perfluoroalkyl group containing from 2 to 20 carbon atoms, R is H or $CH_3$, Q is alkylene of 1 to 15 carbon atoms, hydroxyalkylene of 3 to 15 carbon atoms, $-C_nH_{2n}(OC_qH_{2q})_m-$, $-SO_2NR^1(C_nH_{2n})-$, or $-CONR^1(C_nH_{2n})-$, wherein $R^1$ is H or $C_{1-4}$ alkyl, n is 1 to 15, q is 2 to 4, and m is 1 to 15; and (ii) from 50 to 15 percent by weight of units derived from a monomer or a mixture of monomers selected from the group $$(CH_2=C(R)COZ(CH_2)_r{}^+NR^2R^3R^4)X^-$$

and $$CH_2=C(R)COZ(CH_2)_rNR^2R^3(O)$$

wherein

R is H or $CH_3$, $R^2$ and $R^3$ are each $C_{1-4}$ alkyl, hydroxyethyl, benzyl or $R^2$ and $R^3$ together with the nitrogen atom form a morpholine, pyrrolidine or piperidine ring, $R^4$ is H or $C_{1-4}$ alkyl or $R^2$, $R^3$ and $R^4$ together with the nitrogen atom form a pyridine ring, Z is $-O-$ or $-NR^4-$, r is 2 to 4, and $X^-$ is an anion.

Preferred weight ratios of the components of the copolymers of this invention, based on total weight percent, are from 65 to 85 weight percent of monomer (i) and from 15 to 35 weight percent of monomer (ii). A particularly preferred copolymer of this invention comprises 75 weight percent of $R_fCH_2CH_2O_2CC(CH_3)=CH_2$ wherein $R_f$ is perfluoroalkyl of 4 to 14 carbon atoms and 25 weight percent of $CH_2=C(R)CO_2CH_2CH_2N(C_2H_5)_2(O)$.

DETAILS OF THE INVENTION

The fluorinated monomers are $R_f$-alkylene-$O_2CC(R)=CH_2$, as disclosed in U.S. Pat. Nos. 2,642,416, 3,384,627, 3,392,046, 3,282,905, 3,532,659 and 3,102,103; $R_f$(hydroxyalkylene)$O_2CC(R)=CH_2$ as disclosed in U.S. Pat. No. 3,514,420; $R_fC_nH_{2n}(OC_qH_{2q})_mO_2CC(R)=CH_2$ as disclosed in British Pat. No. 1,243,106; $R_fSO_2NR^1(C_nH_{2n})O_2CC(R)=CH_2$ as disclosed in U.S. Pat. No. 2,803,615; and $R_fCONR^1(C_nH_{2n})O_2CC(R)=CH_2$ as disclosed in U.S. Pat. Nos. 3,304,278 and 3,578,487.

A particularly preferred fluorinated monomer is $R_fCH_2CH_2O_2CC(R)=CH_2$, wherein $R_f$ and R are as defined. Such monomers are known and can be prepared by either esterification of the appropriate alcohol, $R_fCH_2CH_2OH$, with acrylic acid or methacrylic acid or by transesterification with methyl acrylate or methyl methacrylate, for example, as described in U.S. Pat. No. 3,282,905. The methacrylate esters are preferred over the acrylate esters. The perfluoroalkyl group, $R_f$, can be either straight- or branched-chain, with the former being preferred. The monomers, $R_fCH_2CH_2OCOC(R)=CH_2$, can contain a single perfluoroalkyl group, for example, perfluorooctyl, or a mixture of perfluoroalkyl groups. The alcohols, $R_fCH_2CH_2OH$, are commercially available as mixtures wherein $R_f$ contains about 4 to 14 carbon atoms, predominantly six and eight carbon atoms. Monomers prepared from such alcohol mixtures are preferred.

The most preferred perfluoroaliphatic monomer is that wherein R is $CH_3$ and $R_f$ is a mixture of perfluoroalkyl groups, $CF_3CF_2(CF_2)_s-$, wherein s is 2, 4, 6, 8, 10 and 12 in the approximate weight ratio of 2/35/30/18/8/3; such a monomer has a weight average molecular weight of 522. The corresponding acrylate monomer has a weight average molecular weight of 508.

The second essential monomer (ii) used in the copolymer of this invention is a dialkylaminoalkyl acrylate or a dialkylaminoalkyl methacrylate or corresponding acrylamide or methacrylamide as either the amine salt, quaternary ammonium or amine oxide form. Mixtures of the various salt forms are also operable herein. A preferred amine salt monomer is:

$$CH_2=C(R)CO_2CH_2CH_2\overset{+}{\underset{H}{N}}(C_2H_5)_2X^-.$$

Preferred quaternary ammonium monomers are:

$$CH_2=C(R)CO_2CH_2CH_2\overset{+}{\underset{CH_3}{N}}(C_2H_5)_2X^-$$

and $$CH_2=C(R)CONHCH_2CH_2CH_2{}^+N(CH_3)_3X^-.$$

A preferred amine oxide monomer is:

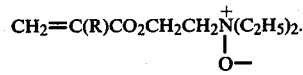

The amine salt monomers are prepared by reacting the corresponding tertiary dialkylaminoalkyl acrylate or dialkylaminoalkyl methacrylate ester or corresponding acrylamide or methacrylamide with an organic or inorganic acid, such as hydrochloric, hydrobromic, sulfuric or acetic acid. The tertiary dialkylaminoalkyl acrylate or dialkylaminoalkyl methacrylate esters are known in the art and can be prepared by either reacting a tertiary amine alcohol of the formula, $HO(CH_2)_rNR^2R^3$ with acryloyl or methacryloyl halide or, preferably, by transesterification with methyl acrylate or methyl methacrylate.

The tertiary dialkylaminoalkyl acrylamides or methacrylamides are prepared by acylating the corresponding dialkylaminoalkyl amine with acryloyl or methacryloyl halide in the presence of an acid acceptor such as triethylamine or pyridine.

The quaternary ammonium monomers are prepared by reacting the aforesaid acrylate or methacrylate esters or corresponding acrylamide or methacrylamide with a di-(lower alkyl) sulfate, a lower alkyl halide, trimethylphosphate or triethylphosphate. Dimethyl sulfate and diethyl sulfate are preferred quaternizing agents.

The amide oxide monomers have the formula $CH_2=C(R)COZ(CH_2)_rNR^2R^3(O)$ as described hereinabove wherein $NR^2R^3(O)$ represents

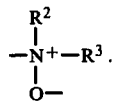

They are prepared by reacting the aforesaid acrylate or methacrylate ester or corresponding acrylamide or methyacrylamide with conventional oxidizing agents such as hydrogen peroxide or peracetic acid and the like.

The nature of the anion, $X^-$, in the quaternary ammonium and amine salt monomer is, in general, determined by the method of synthesis. Usually, $X^-$ is a halide ion, such as chloride, bromide, or iodide, or an acetate ion, or a sulfate ion, or a phosphate ion or an alkylsulfate ion. It is known, however, that quaternary ammonium salts can also be prepared by reacting a tertiary amine with an alkyl ester of benzene or toluenesulfonic acid; in such event, $X^-$ is a benzenesulfonate or toluenesulfonate anion.

The copolymers of the invention are obtained by polymerizing monomers (i) and (ii) by conventional solvent polymerization techniques. Any of the conventional neutral solvents such as ethyl acetate, acetone, 1,2-dichlorotetrafluoroethane, 1,1,2-trichloro-1,2,2-trifluoroethane, ethanol, isopropanol, and mixtures thereof can be used. Isopropanol is a particularly preferred polymerization solvent. The copolymer solutions can be diluted, if desired, with polymerization solvent and/or water. Alternatively, the copolymers can be isolated by removal of solvent.

Alternatively, and preferably, the aforesaid tertiary dialkylaminoalkyl acrylate or dialkylaminoalkyl methacrylate ester or corresponding acrylamide or methacrylamide is first polymerized with fluoromonomer (i) and the tertiary amine groups in the resultant copolymer are converted into the amine salt, quaternary ammonium or amine oxide form by acidification, quaternization or oxidation as already described.

The copolymers of the invention may be prepared by polymerizing fluoromonomer (i) with a mixture of two or more monomers of type (ii) using the same techniques previously described. Thus, for example, a copolymer may be functionalized with half the theoretically required amount of peracetic acid and sufficient acetic acid to give the mixed acetate/amine oxide functionality. Alternatively, fluoromonomer (i) may be copolymerized with a mixture of quaternary monomer and the free base monomer which may be functionalized after polymerization to give the amine oxide.

Conventional free-radical catalysts which are soluble in the solvent system can be used. Particularly preferred are azo compounds such as azobisisobutyronitrile. Catalyst concentration can be about 0.1 to 2 percent based on the weight of total monomers.

Conventional chain transfer agents, such as dodecyl mercaptan and isooctyl thioglycolate, and crosslinking agents, such as ethylene dimethacrylate, can be used in amounts of 0.1 to 2 percent by weight of the monomers to control the molecular weight of the polymer.

The copolymers of this invention are useful to impart oil, water, and organic solvent repellency to a wide range of substrates. Due to their unique combination of aqueous and organic solubility and repellency properties, the copolymers are easy to apply and require little if any curing; thus, they are particularly suitable for treating substrates such as woolen apparel, upholstered furniture, delicate fabrics and leather, where mild drying conditions are desirable. The copolymers are also useful for treating textiles and paper in applications where oil, water or organic solvent repellency is desired.

The copolymers of this invention are adapted to be marketed commercially in the form of stable, aqueous concentrates that can be diluted readily into aqueous treatment baths without flocculation or other practical difficulties. They can be readily diluted with water or aqueous alcohol solution and applied to a wide variety of commercial substrates, including textile fibers, yarns, fabrics or paper by conventional means, such as by spraying, dipping, padding, roller-coating or exhaust techniques.

EXAMPLES

The following Examples illustrate the invention. Unless otherwise indicated, all parts and percentages are by weight. The percent by weight of monomer units in the copolymers is based on the weights of monomers charged.

EXAMPLE 1

A vessel was charged with 850 parts of a fluoromonomer (i) having the formula

wherein $s$ is 2, 4, 6, 8, 10 and 12 in the respective relative amounts of 2:35:30:18:8:3 as determined by gas phase chromatographic analysis, said monomer having a weight average molecular weight of 522, 150 parts of monomer (ii), N,N-diethylaminoethyl methacrylate, and 429 parts of isopropyl alcohol. The charge was purged with nitrogen at reflux for 30 minutes and then cooled to 70° C. Azobisisobutyronitrile (4 parts) was then added to initiate polymerization and the charge was stirred for 17 hours at 67° to 73° C. under nitrogen. A yield of 1422 parts of copolymer dispersion was obtained (70.4% solids).

A mixture of 852.3 parts of the above copolymer dispersion (600 parts on a 100% basis), 1651.7 parts of anhydrous isopropyl alcohol, 57.2 parts of glacial acetic acid and 980 parts of water was stirred at 50° C. A solution of 60 parts of 30% hydrogen peroxide in 200 parts of water was added over 30 minutes at 48° to 50° C. The mixture was stirred at 47° to 53° C. for 2 hours and then at 68° C. to 70° C. for 4 additional hours. The mixture was cooled to room temperature and diluted with 120 parts of isopropyl alcohol and 80 parts of water. A total of 3834 parts of copolymer solution was obtained. The copolymer solids (15.1%) contained 85 percent of perfluoroalkylethyl methacrylate units and 15 percent of N,N-diethylaminoethyl methacrylate amine oxide units.

A 4 × 6 inch piece of 100% woven polyester fabric was immersed in a solution of 0.17 part of the copolymer solids of Example 1 dissolved in 15 ml of absolute ethanol. The ethanol was allowed to evaporate while the fabric was repeatedly dipped until all the copolymer solids were on the fabric. The treated fabric was air-dried and then oven-dried for 3 minutes at 80° C. and then tested for oil and water repellency. Oil repellency was determined using AATCC Standard Test Method 118-1972 of the American Association of Textile Chemists and Colorists. This test comprised placing a drop of one of eight test solutions carefully on the fabric on a flat horizontal surface. The nature of the test solutions was as follows:

| Oil Repellency Rating | Test Solution | Surface Tension dynes/cm at 25° C |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65/35 Hexadecane-"Nujol" | 29.6 |
| 1 | "Nujol" (purified petroleum oil) | 31.2 |

After two minutes, any penetration or wicking into the fabric was noted visually. The oil repellency rating corresponded to the highest numbered test solution for which a drop remained spherical or hemispherical and did not wick into the fabric for at least two minutes.

Water repellency of the treated fabric was determined by carefully placing a drop of seven test solutions on each of three locations at least two inches apart. The nature of the test solutions was as follows:

| Water Repellency Rating | Test Solution |
|---|---|
| 7 | 100% isopropanol |
| 6 | 50/50 isopropanol-water |
| 5 | 30/70 isopropanol-water |
| 4 | 20/80 isopropanol-water |
| 3 | 10/90 isopropanol-water |
| 2 | 5/95 isopropanol-water |
| 1 | 2/98 isopropanol-water |

The water repellency rating correspond to the highest numbered test solution for which two of the three drops remained spherical or hemispherical and did not wick into the fabric for at least two minutes. The higher the water repellency rating, the better the resistance to staining by water-based substances.

Using this test method, treated fabrics with a rating of five or greater are excellent; three or four are good; and anything with a rating of one or greater can be used for certain purposes. The polyester fabric treated with the copolymer of Example 1 exhibited a 3 oil repellency rating and a 5 water repellency rating.

EXAMPLE 2

A vessel was charged with 70 parts of a fluoromonomer (i) having the formula

$$CF_3CF_2(CF_2)_sC_2H_4O_2CC(CH_3)=CH_2$$

wherein $s$ is 2, 4, 6, 8, 10 and 12 in the respective relative amounts of 2:35:30:18:8:3 as determined by gas phase chromatographic analysis, said monomer having a weight average molecular weight of 522, 30 parts of monomer (ii), N,N-diethylaminoethyl methacrylate, and 35 parts of isopropyl alcohol. The charge was purged with nitrogen at reflux for 30 minutes and then cooled to 70° C. Azobisisobutyronitrile (1.0 part) was then added to initiate polymerization and the charge was stirred for 17 hours at 80° to 83° C. under nitrogen. The charge was cooled to 50° C. and a mixture of 9.5 parts glacial acetic acid, 23 parts isopropanol and 23 parts water was added. Twenty parts of 30% hydrogen peroxide was added slowly to convert the polymer to the amine oxide. The charge was held at 50° C. for 1 hour after the peroxide addition. A mixture of 247 parts isopropanol and 205 parts water was then added and the charge m agitated for thirty minutes. A total of 646 parts of mcopolymer solution was obtained. The copolymer solids (14.7%) contained 70 percent of perfluoroalkylethyl methacrylate units and 30 percent of N,N-diethylaminoethyl methacrylate amine oxide units.

EXAMPLES 3 to 13

Examples 3 to 13 were prepared using the general procedure of Example 2. Data for Examples 3 to 13 are shown in Table I. A mixture of fluoromonomer (i), $CF_3CF_2(CF_2)_sC_2H_4O_2CC(CH_3)=CH_2$, wherein $s$ is 2, 4, 6, 8, 10 and 12, and N,N-diethylaminoethyl methacrylate (DEAM) monomer or diemthyl sulfate (DMS) quaternary DEAM monomer was polymerized at 80° to 83° C. ethacrylate (DEAM) monomer or diemthyl sulfate (DMS) quaternary DEAM monomer was polymerized at 80° to 83° C. in isopropanol as solvent, using azobisisobutyronitrile as initiator.

In Example 6, the DEAM quaternary units were present in the polymer as prepared, therefore, no further functionalization was required. The DEAM units in the remaining copolymers were functionalized after polymerization by conversion to either the amine acetate, amine sulfate, amine oxide salt or a mixture thereof. DEAM functionalization was effected by heating (50° to 60° C.) the copolymer dispersion with at least equivalent amounts of acetic acid, sulfuric acid, 30% hydrogen peroxide, 40% peracetic acid or mixtures thereof in aqueous-isopropanol solvent. The non-volatile solids content of the resulting copolymer solution was determined by drying a 0.4 to 0.6 part sample for 2 hours at 110° C. in a vacuum oven at 20-22 in of Hg.

TABLE I

PREPARATION OF COPOLYMERS*

| Example | Fluoro-monomer (i) | DEAM Monomer (ii) | Polymerization Solvent (isopropanol) | Initiator |
|---|---|---|---|---|
| 3 | 70 | 30 | 43 | 0.5 |
| 4 | 70 | 30 | 43 | 0.5 |
| 5 | 70 | 30 | 43 | 0.5 |
| 6 | 70 | 30 (DMS quaternary) | 43 | 0.5 |
| 7 | 85 | 15 | 35 | 1.0 |
| 8 | 80 | 20 | 35 | 1.0 |
| 9 | 75 | 25 | 35 | 1.0 |
| 10 | 65 | 35 | 35 | 1.0 |
| 11 | 60 | 40 | 35 | 1.0 |
| 12 | 55 | 45 | 35 | 1.0 |
| 13 | 50 | 50 | 35 | 1.0 |

DEAM Functionalization

| Example | Reagents | Solvents | Net Wt. | % Solids |
|---|---|---|---|---|
| 3 | 19.5 acetic acid | IPA 43 Water 237 | 395 | 23.6 |
| 4 | 7.2 sulfuric acid | IPA 43 Water 250 | 393 | 23.7 |
| 5 | 31 of 40% peracetic acid | IPA 43 Water 226 | 386 | 23.7 |
| 6 | — | IPA 43 Water 257 | 398 | 23.7 |
| 7 | 9.5 acetic acid 10.0 of 30% H₂O₂ | IPA 282 Water 215 | 618 | 15.9 |
| 8 | 9.5 acetic acid 13.3 of 30% H₂O₂ | IPA 282 Water 212 | 615 | 15.2 |
| 9 | 9.5 acetic acid 16.7 of 30% H₂O₂ | IPA 282 Water 209 | 619 | 15.2 |
| 10 | 9.5 acetic acid 23.3 of H₂O₂ | IPA 282 Water 202 | 605 | 15.7 |
| 11 | 9.5 acetic acid 26.7 of H₂O₂ | IPA 282 Water 199 | 653 | 14.5 |
| 12 | 9.5 acetic acid 30.0 of H₂O₂ | IPA 282 Water 195 | 629 | 15.6 |
| 13 | 9.5 acetic acid 33.3 of H₂O₂ | IPA 282 Water 192 | 652 | 15.6 |

*All numbers in the table are parts by weight except those in the last column.

The polymers prepared in Examples 2 to 13 were diluted with water to form aqueous solutions. These polymers are sufficiently soluble in water to give uniform coverage or substrates. The applications were made on unbleached, unsized Kraft paper by immersing the paper into the treating solution, passing the treated paper between squeeze rollers and drying at room temperature, 80° C., 100° C. and 160° C. as shown in Table II. The concentration of the treating solution was adjusted to deposit 0.1 and 0.2 weight % of fluoromonomer units (in the polymer) on the paper.

The oil and water repellency results are summarized in Tables II and III. In Table II the weight ratio of fluoromonomer to DEAM monomer was held at a constant 70/30. Various functionalities of N,N-diethylaminoethyl methacrylate (DEAM) (acetate, sulfate, amine oxide and dimethyl sulfate quaternary) showed excellent water repellency and fair to good oil repellency at fluoromonomer concentrations of 0.1% or greater.

Table II also shows that the repellency obtained with these copolymers was almost independent of cure temperature. Even samples of treated paper dried at room temperature gave repellency.

TABLE II

Oil and Water Repellency of Functionalized Fluoromonomer/DEAM Copolymers On Unbleached Kraft Paper (70/30 weight ratio)

| Copolymer from Ex. | Repellency of | 0.2% Fluoromonomer (owp) | | | | 0.1% Fluoromonomer (owp) | | | |
|---|---|---|---|---|---|---|---|---|---|
| | | 160° C | 100° C | 80° C | RT | 160° C | 100° C | 80° C | RT |
| 2 | Oil | 4 | 5 | 5 | 4 | 4 | 4 | 2 | — |
|   | Water | 6 | 6 | 6 | 6 | 6 | 5 | 6 | 6 |
| 3 | Oil | 4 | 5 | 4 | 3 | 3 | — | 3 | 2 |
|   | Water | 6 | 5 | 6 | 6 | 6 | 5 | 6 | 5 |
| 4 | Oil | 5 | 5 | 4 | 4 | 4 | — | 4 | 2 |
|   | Water | 6 | 6 | 6 | 6 | 6 | 6 | 6 | 6 |
| 5 | Oil | 4 | 3 | 3 | 3 | 3 | — | 1 | 1 |
|   | Water | 6 | 5 | 6 | 5 | 6 | 5 | 6 | 5 |
| 6 | Oil | 4 | 5 | 4 | 4 | 2 | — | 1 | 1 |
|   | Water | 6 | 6 | 6 | 6 | 6 | 6 | 6 | 5 |

Table III summarizes the repellency performance of copolymers of fluoromonomers with DEAM amine-oxide in which the concentration of fluoromonomer is varied between 15 to 50 percent. Water repellency was excellent over the whole range of concentrations but optimum oil repellency was obtained in the 70 to 85% fluoromonomer range.

TABLE III

Oil and Water Repellency of Fluoromonomer/DEAM Amine Oxide Copolymers Containing Varying Amounts of Fluoromonomer on Unbleached Kraft Paper

| Copolymer From Example No. | Fluoromonomer DEAM Amine Oxide | Repellency of | Wt % Fluoromononer on paper | |
|---|---|---|---|---|
| | | | 0.2 | 0.1 |
| 7 | 85/15 | Oil | 4 | 3 |
|   |       | Water | 6 | 6 |
| 8 | 80/20 | Oil | 5 | 4 |
|   |       | Water | 6 | 6 |
| 9 | 75/25 | Oil | 6 | 4 |
|   |       | Water | 6 | 6 |
| 2 | 70/30 | Oil | 4 | 4 |
|   |       | Water | 6 | 6 |
| 10 | 65/35 | Oil | 3 | 3 |
|    |       | Water | 6 | 5 |
| 11 | 60/40 | Oil | 2 | 1 |
|    |       | Water | 5 | 5 |
| 12 | 55/45 | Oil | 2 | 1 |
|    |       | Water | 5 | 5 |
| 13 | 50/50 | Oil | 0 | 0 |
|    |       | Water | 5 | 4 |

The embodiments of the invention in which an exclusive property or privilege is claimed are defined as follows:

1. A copolymer comprising the following components:
   (i) from 50 to 85 percent by weight of units derived from a monomer of the formula

wherein
   $R_f$ is a straight- or branched-chain perfluoroalkyl group containing from 2 to 20 carbon atoms,
   R is H or $CH_3$, Q is alkylene of 1 to 15 carbon atoms, hydroxyalkylene of 3 to 15 carbon atoms, $-C_nH_{2n}(OC_qH_{2q})_m-$, $-SO_2NR^1(C_nH_{2n})-$, or $-CONR^1(C_nH_{2n})-$, $R^1$ is H or $C_{1-4}$ alkyl,
$n$ is 1 to 15,
$q$ is 2 to 4, and
$m$ is 1 to 15; and (ii) from 50 to 15 percent by weight of units derived from a monomer or a mixture of monomers selected from the group $(CH_2=C(R)COZ(CH_2)_r+NR^2R^3R^4)X^-$ and $CH_2=C(R)COZ(CH_2)_rNR^2R^3(O)$ wherein
R is H or $CH_3$,
$R^2$ and $R^3$ are each $C_{1-4}$ alkyl, hydroxyethyl, benzyl or $R^2$ and $R^3$ together with the nitrogen atom form a morpholine, pyrrolidine or piperidine ring,
$R^4$ is H or $C_{1-4}$ alkyl or $R^2$, $R^3$ and $R^4$ together with the nitrogen atom form a pyridine ring,
Z is —O— or —$NR^4$—,
$r$ is 2 to 4, and
$X^-$ is an anion.

2. A copolymer according to claim 1 wherein component (ii) is derived from units of the monomer $(CH_2=C(R)COZ(CH_2)_r+NR^2R^3R^4)X^-$ wherein
$R_2$ is H or $CH_3$,
$R^2$ and $R^3$ are each $C_{1-4}$ alkyl, hydroxyethyl, benzyl or $R^2$ and $R^3$ together with the nitrogen atom form a morpholine, pyrrolidine or piperidine ring,
$R^4$ is H or $C_{1-4}$ alkyl or $R^2$, $R^3$ and $R^4$ together with the nitrogen atom form a pyridine ring,
Z is —O— or —$NR^4$—,
$r$ is 2 to 4, and
$X^-$ is an anion.

3. A copolymer according to claim 1 wherein component (ii) is derived from units of the amine oxide monomer $CH_2=C(R)COZ(CH_2)_rNR^2R^3(O)$ wherein
R is H or $CH_3$,
Z is —O— or —$NR^4$—,
$r$ is 2 to 4, and
$R^2$ and $R^3$ are each $C_{1-4}$ alkyl, hydroxyethyl, benzyl or together with the nitrogen atom form a morpholine, pyrrolidine or piperidine ring, and
$R^4$ is H or $C_{1-4}$ alkyl.

4. A copolymer according to claim 1 wherein component (i) is present in the amount of 65 to 85 precent by weight and component (ii) is present in the amount of 15 to 35 percent by weight.

5. A copolymer according to claim 2 wherein component (i) is present in the amount of 65 to 85 percent by weight and component (ii) is present in the amount of 15 to 35 percent by weight.

6. A copolymer according to claim 3 wherein component (i) is present in the amount of 65 to 85 percent by weight and component (ii) is present in the amount of 15 to 35 percent by weight.

7. A copolymer according to claim 1 wherein component (i) is present in the amount of 75 percent by weight and component (ii) is present in the amount of 25 percent by weight.

8. A copolymer according to claim 2 wherein component (i) is present in the amount of 75 percent by weight and component (ii) is present in the amount of 25 percent by weight.

9. A copolymer according to claim 3 wherein component (i) is present in the amount of 75 percent by weight and component (ii) is present in the amount of 25 percent by weight.

10. A copolymer according to claim 9 wherein the units of component (i) are $R_fCH_2CH_2O_2CC(CH_3)=CH_2$ and wherein the units of component (ii) are $CH_2=C(CH_3)CO_2CH_2CH_2N(C_2H_5)_2(O)$, wherein $R_f$ is a perfluoroalkyl group containing from 4 to 14 carbon atoms.

11. A copolymer according to claim 9 wherein the units of component (i) are $R_fCH_2CH_2O_2CC(CH_3)=CH_2$ and wherein the units of component (ii) are $CH_2=C(H)CO_2CH_2CH_2N(C_2H_5)_2(O)$, wherein $R_f$ is a perfluoroalkyl group containing from 4 to 14 carbon atoms.

12. A copolymer according to claim 8 wherein the units of component (i) are $R_fCH_2CH_2O_2CC(CH_3)=CH_2$ and wherein the units of component (ii) are $CH_2=C(H)CO_2CH_2CH_2+NH(C_2H_5)_2X^-$ wherein $R_f$ is a perfluoroalkyl group containing from 4 to 14 carbon atoms.

13. A copolymer according to claim 8 wherin the units of component (i) are $R_fCH_2CH_2O_2CC(CH_3)=CH_2$ and wherein the units of component (ii) are $CH_2=C(CH_3)CO_2CH_2CH_2+NH(C_2H_5)_2X^-$ wherein $R_f$ is a perfluoroalkyl group containing from 4 to 14 carbon atoms.

14. A copolymer according to claim 8 wherein the units of component (i) are $R_fCH_2CH_2O_2CC(CH_3)=CH_2$ and wherein the units of component (ii) are $$CH_2=C(H)CO_2CH_2CH_2{}^+N(CH_3)(C_2H_5)_2X^-$$

wherein $R_f$ is a perfluoroalkyl group containing from 4 to 14 carbon atoms.

15. A copolymer according to claim 8 wherein the units of component (i) are $$R_fCH_2CH_2O_2CC(CH_3)=CH_2$$

and wherein the units of component (ii) are $$CH_2=C(CH_3)CO_2CH_2CH_2{}^+N(CH_3)(C_2H_5)_2X^-$$

wherein $R_f$ is a perfluoroalkyl group containing from 4 to 14 carbon atoms.

16. A copolymer according to claim 8 wherein the units of component (i) are $$R_fCH_2CH_2O_2CC(CH_3)=CH_2$$

and wherein the units of component (i) are $$CH_2=C(H)CONHCH_2CH_2CH_2{}^+N(CH_3)_3X^-$$

wherein $R_f$ is a perfluoroalkyl group containing from 4 to 14 carbon atoms.

17. A copolymer according to claim 8 wherein the units of component (i) are $$R_fCH_2CH_2O_2CC(CH_3)=CH_2$$

and wherein the units of component (ii) are $$CH_2=C(CH_3)CONH(CH_2)_3N^+N(CH_3)_3X^-$$

wherein $R_f$ is a perfluoroalkyl group containing from 4 to 14 carbon atoms.

* * * * *

UNITED STATES PATENT OFFICE
CERTIFICATE OF CORRECTION

PATENT NO. : 4,147,851                                   Page 1 of 2
DATED      : APRIL 3, 1979
INVENTOR(S): STUART RAYNOLDS It is certified that error appears in the above-identified patent and that said Letters Patent are hereby corrected as shown below:

Column 9, line 19, Claim 1, "$(CH_2=C(R)COZ(CH_2)_r{}^+NR^2R^3R^4)X^-$" should be -- $(CH_2=C(R)COZ(CH_2)_r\overset{+}{N}R^2R^3R^4)X^-$ --.

Column 9, line 38, Claim 2, "$(CH_2=C(R)COZ(CH_2)_r{}^+NR^2R^3R^4)X^-$" should be -- $(CH_2=C(R)COZ(CH_2)_r\overset{+}{N}R^2R^3R^4)X^-$ --.

Column 10, line 48, Claim 12, "$CH_2=C(H)CO_2CH_2CH_2{}^+NH(C_2H_5)_2X^-$" should be -- $CH_2=C(H)CO_2CH_2CH_2\overset{+}{N}H(C_2H_5)_2X^-$ --.

Column 10, line 63, Claim 13, "$CH_2=C(CH_3)CO_2CH_2CH_2{}^+NH(C_2H_5)_2X^-$" should be -- $CH_2=C(CH_3)CO_2CH_2CH_2\overset{+}{N}H(C_2H_5)_2X^-$ --.

Column 11, line 1, Claim 14, "$CH_2=C(H)CO_2CH_2CH_2{}^+N(CH_3)(C_2H_5)_2X^-$" should be -- $CH_2=C(H)CO_2CH_2CH_2\overset{+}{N}(CH_3)(C_2H_5)_2X^-$ --.

UNITED STATES PATENT OFFICE
CERTIFICATE OF CORRECTION

PATENT NO. : 4,147,851

DATED : APRIL 3, 1979

INVENTOR(S) : STUART RAYNOLDS

It is certified that error appears in the above-identified patent and that said Letters Patent are hereby corrected as shown below:

Column 11, line 12, Claim 15,
"$CH_2=C(CH_3)CO_2CH_2CH_2\overset{+}{N}(CH_3)(C_2H_5)_2X^-$" should be
-- $CH_2=C(CH_3)CO_2CH_2CH_2\underset{+}{N}(CH_3)(C_2H_5)_2X^-$ --.

Column 12, line 1, Claim 16, "(i)" should be -- (ii) --.

Column 12, line 14, Claim 17,
"$CH_2=C(CH_3)CONH(CH_2)_3\overset{+}{N}N(CH_3)_3X^-$" should be
-- $CH_2=C(CH_3)CONH(CH_2)_3\underset{+}{N}(CH_3)_3X^-$ --.

Signed and Sealed this

Eleventh Day of December 1979

[SEAL]

Attest:

SIDNEY A. DIAMOND

*Attesting Officer*     *Commissioner of Patents and Trademarks*